Figure 1:
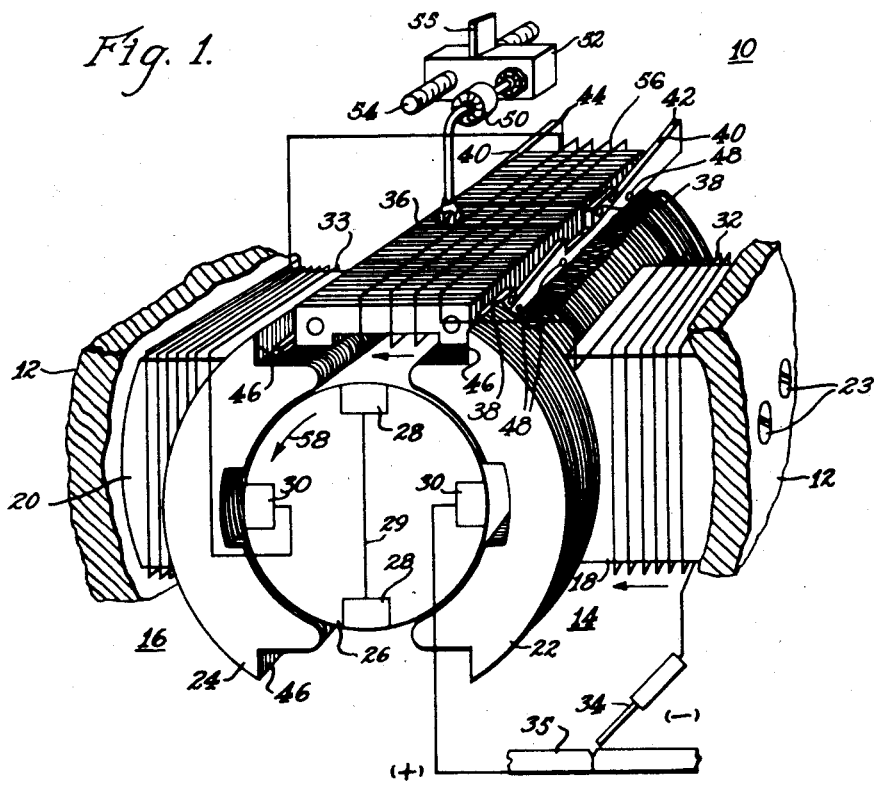

Dec. 2, 1941.    J. H. BLANKENBUEHLER ET AL    2,264,272

WELDING GENERATOR

Filed June 23, 1939

WITNESSES:
C. F. Oberheim.
F. V. Giolma

INVENTORS
John H. Blankenbuehler &
William R. Harding.
BY
G. M. Crawford
ATTORNEY Patented Dec. 2, 1941

2,264,272

UNITED STATES PATENT OFFICE 2,264,272

WELDING GENERATOR

John H. Blankenbuehler, Edgewood, and William R. Harding, Murrysville, Pa., assignors to Westinghouse Electric & Manufacturing Company, East Pittsburgh, Pa., a corporation of Pennsylvania Application June 23, 1939, Serial No. 280,688

8 Claims. (Cl. 171—227)

Our invention relates generally to generators, and it has reference, in particular, to welding generators of cross-field type for use in electric arc-welding.

When performing electric arc-welding operations with a metallic electrode, the metallic electrode may be temporarily short-circuited at frequent intervals to the work on which the welding operation is being performed by molten globules of the electrode bridging the gap between the electrode and the work. Thus, the welding generator may be frequently short-circuited during the normal welding operation, and it becomes, therefore, important to provide the welding generator with suitable load characteristics so that the proper arc voltage will be attained almost instantaneously upon the removal of such short-circuit condition, and insure the establishment of a stable welding arc.

As the cross-field generator of the type with which this invention is concerned is purposely provided with field poles having body members of limited cross-section with series field windings thereon to effect magnetic saturation of the body members throughout the entire operating range of the welding generator, and thus establish a substantially constant magnetic flux therethrough, it may be realized that the control of the load characteristics of such a generator presents a peculiar problem, not encountered in generators of the usual type.

It is, therefore, an object of our invention, generally stated, to provide for improving the load characteristics of a generator of the cross-field type so as to render it more suitable for use in electric arc welding applications.

More specifically, it is an object of our invention to provide for controlling the leakage flux in a magnetic shunt member in a generator of the cross-field type so as to effectively increase the armature excitation flux during the transient period subsequent to a short-circuit of the generator, and thus assist the attainment of the proper arc voltage.

Another object of our invention is to provide for effecting a change in the excitation flux of a generator of the cross-field type by providing a field winding on an adjustable magnetic shunt member positioned in bridged relation between the field poles of the generator, which is connected in series circuit relation with the load circuit.

A further object of our invention is to provide for assisting in the recovery of the normal arc voltage of a generator of the cross-field type, subsequent to a short-circuit thereof, by utilizing a winding on a slidable magnetic shunt member so as to effect a reduction in the leakage flux in the shunt member in response to a reduction in the welding current.

Still another object of our invention is to provide for controlling the output of a welding generator over as wide a range as possible and increasing the open circuit voltage for a given value of welding current so as to facilitate maintenance of the welding arc.

Other objects will, in part, be obvious, and will, in part, appear hereinafter.

In practicing a preferred embodiment of our invention, a welding generator of the cross-field type is provided with a slidable magnetic shunt member which is positioned in bridged relation between the adjacent pole tips of the oppositely positioned field pole members of the generator. The shunt member is preferably supported by means of guide members secured to the field pole members in any suitable manner, and is operatively connected, by means of a coupling member, to a traveling nut member which is positioned on the threaded portion of an axially disposed rotatable shaft. The rotatable shaft may be operated by means of a hand-wheel to urge the shunt member along sloping bearing surfaces of the guide members so as to effect any desired movement thereof in accordance with the contour of the sloping bearing surfaces, and vary the magnetic reluctance of the leakage path between the adjacent tips of the field pole members.

In order to facilitate a rapid recovery of the arc voltage subsequent to a short-circuit of the welding generator, a winding is provided on the shunt member and connected in series circuit relation with the welding circuit, so that when a short circuit is removed from the generator and the current in the welding circuit is decreased, the amount of leakage flux in the shunt member will likewise be decreased. As the excitation flux of the generator remains substantially unchanged because of the saturation of the field pole members, the proportion of the excitation flux passing through the armature of generator must necessarily increase. The current generated in the auxiliary brush armature circuit of the generator therefore increases, and the cross-field flux produced thereby also increases, resulting in an immediate increase in the arc voltage so that the welding arc may be readily established.

For a more complete understanding of the nature and scope of our invention, reference may be had to the following detailed description, taken in connection with the accompanying drawing, in which Figure 1 is a schematic perspective view in part of a welding generator embodying the principal features of our invention.

Figure 2:
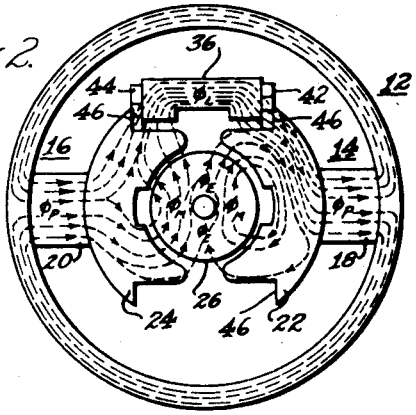
Figure 3:
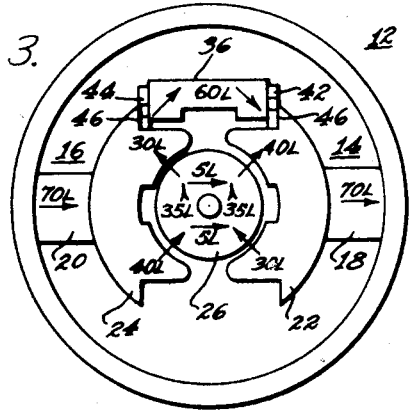
Figure 4:
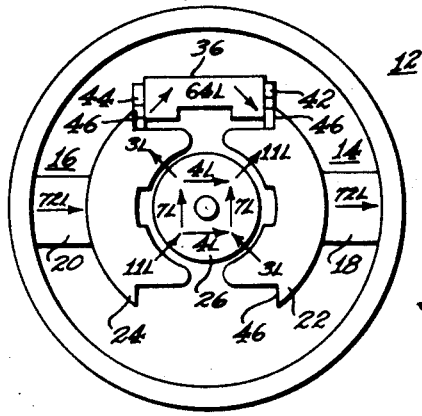

Fig. 2 is a view of the magnetic circuit of the generator of Fig. 1, showing the resultant magnetic flux paths therein under load conditions, Fig. 3 is a view of the magnetic circuit of the generator of Fig. 1 indicating the proportionate flux distribution therein at arcing voltage, and Fig. 4 is a view of the magnetic circuit of the generator indicating the proportionate flux distribution therein at short-circuit.

Referring particularly to Fig. 1 of the drawing, the reference numeral 10 denotes, generally, a welding generator of the cross-field type which comprises a frame 12, which is shown only in part, having field poles 14 and 16 positioned therein in opposed relation. Inasmuch as the main magnetic flux in a generator of the cross-field type is produced in the shoe portion of the field poles by the armature itself, the field poles 14 and 16 comprise, preferably, body members 18 and 20, which may be of limited cross-section so that they will be magnetically saturated under normal operating conditions, and enlarged arcuate shoe members 22 and 24, respectively, for providing a low reluctance path for the cross-field flux. The body members and the shoe members of the field poles may be secured to each other and to the frame 12 in any suitable manner, as by means of the bolts 23, which pass through the frame and the body members, and into threaded engagement with the shoe members.

An armature 26, which is provided with auxiliary brushes 28 that are positioned mid-way between the shoe members and connected by the conductor 29, and main brushes 30 that are positioned along the center line of the field pole members, may be rotatively supported between the arcuate shoe members 22 and 24, in any suitable manner. Field windings 32 and 33 for producing the excitation flux of the generator are positioned on the body members 18 and 20 of the field poles, and are connected in series circuit relation with the main brushes 30 and the welding circuit, which comprises the electrode 34 and work 35 upon which a welding operation is to be performed.

In order to vary the output of the generator a slidable magnetic shunt member 36 is provided, having bearing members 38 secured to the opposite sides thereof for supporting the shunt member on the sloping bearing surfaces 40 of suitable guide members 42 and 44, which may be, for example, attached to the adjacent tips of the shoe members 22 and 24. The guide members 42 and 44 comprise, preferably, plates of brass or some other suitable non-magnetic material, and may be secured to vertical faces 46 of the shoe members in any suitable manner, such as by means of screws 48.

The shunt member 36 is preferably operatively connected by means such as the coupling member 50 to a travelling nut member 52, which is positioned on an axially disposed rotatable shaft member 54. By rotating the shaft 54 through the use of a handwheel (not shown) or other suitable means, the shunt member 36 may be moved in an axial direction relative to the shoe members 22 and 24 along any desired path in a vertical plane through the longitudinal axis of the generator as determined by the contour of the sloping bearing surfaces 40, upon which it is supported. As the shunt member 36 is thus moved, the section of the shunt member between the adjacent tips of the shoe members 22 and 24 varies, and the shunt member moves vertically relative to the shoe member. The magnetic reluctance of the leakage path between the shoe members 22 and 24 may thus be varied over a wide range without requiring more than a limited longitudinal or axial movement of the shunt member 36, and without necessitating the use of a complicated operating mechanism, the compound motion of the shunt member being derived from the simple axial movement of the travelling nut member 52, which may be provided with an upwardly projecting fin 55 which may project through a slot in the frame 12 to indicate the output of the generator for any position of the shunt member on a suitable fixed scale (not shown).

A winding 56 is positioned about the shunt member 36 and connected in series circuit relation with the field windings 32 and 33 in the welding circuit. The winding 56 is so connected that it normally increases the amount of leakage flux in the shunt member 36. Thus when there is a reduction in the welding current, there will be a corresponding decrease in the leakage flux in the shunt member.

In order to best understand the manner and mode of operation of our invention, reference may be made particularly to Figs. 2, 3 and 4 of the drawing. It will be understood therefrom that the magnetic flux indicated by the dotted lines $\phi_P$, which is produced by the field windings 32 and 33, remains substantially constant during the change from short circuit to arc conditions, because the body members 18 and 20 of the field poles of the generator are purposely designed with reduced cross-sections so that the body members are magnetically saturated throughout substantially the entire operating range of the generator. Inasmuch as the generator 10 is of the cross-field type, the voltage across the main brushes 30 is directly dependent upon the value of the cross-field, or main flux, which is indicated by the dotted lines $\phi_M$, and which is produced by the circulating current $i$, which flows in the auxiliary brush circuit of the armature between the close-circuited auxiliary brushes 28. This circulating current $i$ is generated by the armature conductors cutting the excitation flux indicated by the dotted lines $\phi_E$, which traverses the armature in a substantially diagonal direction from the shoe member 24 to the shoe member 22. Rotation of the armature 26 may be assumed to be in the counter-clockwise direction as indicated by the curved arrow 58 in Fig. 1.

In order to change the voltage across the main brushes 30 from the short-circuit value to the desired arc value, it is necessary that the cross-field flux $\phi_M$ be increased from a value of $7_L$ in the armature, as shown in Figure 4, which represents the relative value of this flux, or number of flux lines under short-circuit conditions, to a value of $35_L$ as shown in Figure 3, which represents the relative value thereof under normal arc conditions. Inasmuch as the flux $\phi_M$ is produced by the circulating current $i$, which flows in the armature between the auxiliary brushes 28, it is necessary to increase the current $i$ so as to produce the desired increase in the flux $\phi_M$.

Since the circulating current $i$ is generated in the auxiliary brush circuit of the armature 26 by the conductors thereof cutting the excitation flux $\phi_E$, it will be understood that it is necessary, therefore, to provide for increasing the excitation flux $\phi_E$ immediately subsequent to the termination of a short-circuit condition, so as to provide the desired increase of voltage in the main brush circuit of the generator.

By providing the winding 56 on the magnetic shunt member 36, and connecting it in a series circuit relation with the main brushes 30 of the generator, a magneto-motive force will be applied to the shunt member 36 which is proportional to the welding current in the circuit of the main brushes 30. By connecting the winding 56 so that the magneto-motive force produced thereby is in a direction so as to normally increase the leakage flux through the shunt member, indicated by the dotted lines $\phi_L$, the leakage flux therethrough will be immediately decreased upon a decrease in the welding current. Inasmuch as the total magnetic flux $\phi_P$ produced by the series field windings 32 and 33 on the field pole body members remains substantially constant, as the body members 18 and 20 of the field poles are magnetically saturated, the decrease in the leakage flux $\phi_L$ occasioned by the decrease of current in the winding 56 automatically effects an increase in the excitation flux $\phi_E$ in the armature, since the flux $\phi_P$ must be equal to the sum of the flux $\phi_E$ and $\phi_L$. The increase of the excitation flux $\phi_E$ results in an increase of the circulating current $i$ in the auxiliary brush armature circuit, thus effecting an increase in the cross-field flux $\phi_M$, so that the voltage across the main brushes 30 is increased as was desired.

By thus providing a series field winding on the slidable magnetic shunt member, which is primarily utilized for controlling the output of the generator, the dynamic characteristics of the cross-field generator are greatly improved.

Inasmuch as the winding 56 increases the value of the leakage flux $\phi_L$ under load conditions, in order to position the shunt member 36 for a given output setting, the air gap between it and the pole shoes 22 and 24 will be greater than it would if the winding 56 were not used. Accordingly, the no-load flux leakage through the shunt member 36 is decreased, the winding 56 being de-energized under no-load conditions, and the no-load open circuit voltage of the generator is thus increased, making it easier to strike and also maintain an arc thus rendering this type of generator much more suitable for use in arc welding operations.

The effect of the winding on the magnetic shunt member at the maximum welding current of the generator may be slightly reduced because of the relatively large air gap which is inserted in the leakage path at the high current settings, but because the arc is much more stable at the higher current values and the transient characteristics of the generator are more suitable for arc welding operations at the high current values, this diminution of the effect of the coil does not effect the operation of the generator, and it permits the attainment of output values equally as high as are obtainable with generators not having such a winding. Over the lower range of welding currents, tests have shown that the performance of the generator is materially improved. The output value may be lowered considerably below that obtainable in generators not having such a winding, because of the increase thereby effected in the leakage flux $\phi_L$ in the lower range of welding currents, so that the possible range of output control is extended. The value of minimum welding current at which it is practicable to maintain a stable welding is reduced, thus allowing the generator to be arc operated over a much wider range of welding current values and resulting in a more stable arc and better welds throughout the entire range.

Since certain changes may be made in the invention without departing from the spirit and scope thereof, it is intended that all the material contained in the above description, and shown in the accompanying drawing, shall be considered as illustrative, and not in a limiting sense.

We claim as our invention;

1. The combination in a welding generator of the cross-field type, of a pair of field poles of opposite polarity having arcuate shoe members, an armature positioned between the shoe members having main and auxiliary brushes, circuit means connecting the auxiliary brushes to provide a closed armature path for inducing a cross-field flux in the shoe members, a field winding positioned on at least one of the field poles and connected in series circuit relation with the main brushes and a welding circuit to provide an excitation flux for the closed armature circuit, a slidable magnetic shunt member positioned in bridged relation between the shoe members, and a winding positioned on the shunt member and connected in series circuit relation with the main brushes and welding circuit for controlling the diversion of the excitation flux in accordance with changes of the welding current.

2. In a generator of the cross-field type the combination, of a pair of field poles of opposite polarity, an armature having main and auxiliary brushes rotatably positioned between the field poles, a field winding disposed on at least one of the field poles and connected in series circuit relation with the main brushes, a single magnetic shunt member adjustably positioned in bridged relation between the field poles to provide a path for a leakage flux, and a winding positioned on the shunt member and connected in series circuit relation with the main brushes and the series field winding so as to normally increase the amount of leakage flux in the shunt member.

3. A welding generator comprising, in combination, an armature having main and auxiliary brushes, a pair of field poles positioned on opposite sides of the armature having arcuate shoe members adjacent the armature and body members with series field windings positioned thereon, said body members being of reduced cross section to effect magnetic saturation thereof under normal load conditions and provide a substantially constant magnetic flux therethrough, a slidable magnetic shunt member supported in bridged relation between the shoe members to provide an adjustable reluctance path for a leakage flux, and a winding positioned on the shunt member and connected in series circuit relation with the main brushes to vary the leakage flux in the shunt member in the opposite sense to variations of the current in the main brush circuit.

4. The combination in a welding generator of the cross-field type, of a pair of field poles with restricted body members having field windings positioned thereon and connected in series circuit relation with a welding circuit to provide a substantially constant excitation flux, arcuate shoe members secured to the body members to provide a low reluctance path for a cross-field flux, an armature having main and auxiliary brushes rotatably positioned between the shoe members, said auxiliary brushes being close-circuited to provide a closed armature path for a cross-field magnetizing current, a slidable magnetic shunt member supported on adjacent tips of the shoe members for varying the reluctance of the leakage path between the shoe members, and a winding positioned on the shunt member and connected in series circuit relation with the welding circuit to effect a variation of the excitation flux in the opposite sense to changes of the welding current.

5. A generator of the cross-field type comprising, in combination, a pair of oppositely positioned field poles having saturable body members and enlarged arcuate shoe members to provide a low-reluctance path for a transverse cross-field flux, an armature rotatably positioned between the field pole members having main and auxiliary brushes, circuit means connecting the auxiliary brushes to provide a closed armature path for a cross field magnetizing current, a series field winding disposed on the body member of at least one of the field poles for providing a substantially constant magnetic flux therein, a movable magnetic shunt member positioned in bridged relation between the shoe members for varying the output of the generator, and a winding positioned on the shunt member connected in series circuit relation with the main brushes for effecting a reduction in the leakage flux in the shunt member in response to a reduction in the current in the circuit of the main brushes so as to effect a corresponding increase in the cross-field flux.

6. A generator of the cross-field type comprising, in combination a pair of oppositely positioned field pole members having body members of reduced section, an armature rotatably positioned between the field pole members having main and auxiliary brushes, a field winding positioned on at least one of the field pole members and connected in series circuit relation with the main brushes to provide a substantially constant field flux, a magnetic member slidably positioned in bridged relation between the field pole members to provide a variable leakage path for the said field flux so as to control the output of the generator, and a winding positioned on the shunt member and connected in series circuit relation with the main brushes to normally increase the amount of leakage flux in the shunt member, so as to effect a reduction thereof immediately following a change from short circuit to arcing conditions.

7. A welding generator comprising a frame, a pair of oppositely positioned field poles secured in the frame with series field windings thereon, said field poles having a body member of reduced cross section to restrain variations in the flux therein under normal load conditions, an armature rotatably positioned between the field poles having load circuit brushes, a single magnetic shunt member supported on the field poles, adjusting means for varying the position of the shunt member relative to the field poles, and a winding positioned on the shunt member and connected in series circuit relation with the field windings and the load circuit brushes.

8. The combination in a generator, of a pair of field pole members positioned in opposed relation, an armature rotatably positioned between the field pole members having load circuit brushes, a magnetic shunt member positioned between the field pole members slidable axially to vary the magnetic leakage flux therebetween and vary the output of the generator, and a winding positioned on the shunt member connected in series circuit relation with the load circuit brushes, said winding being connected in such sense as to vary the leakage flux in accordance with the value of the load current and thus provide a higher open circuit voltage for a given output and accelerate the change of excitation flux in the armature in the opposite direction to a change of current in the load circuit.

JOHN H. BLANKENBUEHLER.
WILLIAM R. HARDING.